US011783414B2

(12) United States Patent
Roser et al.

(10) Patent No.: US 11,783,414 B2
(45) Date of Patent: Oct. 10, 2023

(54) DEEP LEARNING APPROACH FOR ASSESSING CREDIT RISK

(71) Applicant: Refinitiv US Organization LLC, New York, NY (US)

(72) Inventors: Ryan Roser, Portland, OR (US); Adam Bronstein, San Francisco, CA (US)

(73) Assignee: Refinitiv US Organization LLC, New York, NY (US)

( * ) Notice: Subject to any disclaimer, the term of this patent is extended or adjusted under 35 U.S.C. 154(b) by 129 days.

(21) Appl. No.: 16/381,137

(22) Filed: Apr. 11, 2019

(65) Prior Publication Data
US 2019/0318422 A1 Oct. 17, 2019

Related U.S. Application Data

(60) Provisional application No. 62/655,974, filed on Apr. 11, 2018.

(51) Int. Cl.
*G06Q 40/03* (2023.01)
*G06N 20/00* (2019.01)
(Continued)

(52) U.S. Cl.
CPC ............ *G06Q 40/03* (2023.01); *G06N 3/08* (2013.01); *G06N 7/01* (2023.01); *G06N 20/00* (2019.01)

(58) Field of Classification Search
CPC ...... G06Q 40/025; G06Q 40/00; G06Q 20/00; G06Q 40/03
(Continued)

(56) References Cited

U.S. PATENT DOCUMENTS

| 7,974,918 B1 * | 7/2011 | Kunde ................ G06Q 40/025 |
| | | 705/38 |
| 8,671,040 B2 | 3/2014 | Roser |

(Continued)

FOREIGN PATENT DOCUMENTS

CN 103839183 A 6/2014

OTHER PUBLICATIONS

Altman, E. I. (2013). Predicting financial distress of companies: revisiting the Z-score and ZETA® models. In Handbook of research methods and applications in empirical finance. Edward Elgar Publishing. (Year: 2013).*

(Continued)

*Primary Examiner* — Eric T Wong
*Assistant Examiner* — John O Preston
(74) *Attorney, Agent, or Firm* — Sheppard Mullin Richter & Hampton LLP (57) ABSTRACT

Systems and methods to facilitate credit risk assessment are described herein. The systems and methods described herein relate to implementing and training a credit risk model comprising a document model and a company model. The document model may be configured to read text of a document, understand long range relationships between words, phrases, and the occurrence of one or more financial events, and create a document score that indicates whether the financial events are likely to occur based on that document. A document-model-state vector may be generated that represents important features and relationships identified within each document and across a set of documents for a given entity based on the document scores. The company model may produce a sequence of default probability scores representing overall likelihoods of the occurrence of the financial events for an entity based on the document-model-state vector for documents associated with that entity.

36 Claims, 4 Drawing Sheets

(51) Int. Cl.
  *G06N 3/08* (2023.01)
  *G06N 7/01* (2023.01)
(58) Field of Classification Search
  USPC .......................................................... 705/38
  See application file for complete search history.

(56) References Cited

U.S. PATENT DOCUMENTS

| | | | | |
|---|---|---|---|---|
| 2007/0136186 | A1* | 6/2007 | Libman | G06Q 40/02 |
| | | | | 705/38 |
| 2008/0154791 | A1* | 6/2008 | Bannister | G06Q 40/025 |
| | | | | 705/36 R |
| 2017/0235824 | A1 | 8/2017 | Liu | |
| 2018/0032870 | A1 | 2/2018 | Liu | |
| 2018/0253657 | A1* | 9/2018 | Zhao | G06N 20/00 |

OTHER PUBLICATIONS

Chaudhary, Khyati, Jyoti Yadav, and Bhawna Mallick. "A review of fraud detection techniques: Credit card." International Journal of Computer Applications 45.1 (2012): 39-44. (Year: 2012).*

Rivner, Uri. "Identity crisis: Detecting account opening fraud in the age of identity commoditisation." Cyber Security: A Peer-Reviewed Journal 1.4 (2018): 316-325. (Year: 2018).*

Cheney, Julia S., et al. "Consumer use of fraud alerts and credit freezes: An empirical analysis." FRB of Philadelphia—Payment Cards Center Discussion Paper 14-4 (2014). (Year: 2014).*

International Search Report and Written Opinion of International Application No. PCT/IB2019/052995, dated Jul. 23, 2019, 11 pages.

* cited by examiner

DEEP LEARNING APPROACH FOR ASSESSING CREDIT RISK

CROSS-REFERENCE TO RELATED APPLICATIONS

This application claims the benefit of U.S. Provisional Patent Application Ser. No. 62/655,974, entitled "DEEP LEARNING APPROACH FOR ASSESSING CORPORATE CREDIT RISK", filed Apr. 11, 2018, which is hereby incorporated by reference in its entirety.

FIELD OF THE INVENTION

The systems and methods described herein relate to assessing credit risk.

BACKGROUND

Filing for bankruptcy and/or defaulting on a debt can adversely affect the credit of an entity, such as a company or firm. It is important to be able to identify adverse future events an entity may face and establish procedures to measure, mitigate, and manage risk. For example, investors extending credit to entities must be able to assess potential losses resulting from such activity. Similarly, investors who hold an equity interest in entities must be able to assess potential volatility affecting those investments and adjust their portfolios accordingly.

Various credit risk models exist to assess the default probability of an entity. A broad range of sources may be utilized by these credit risk models. Many of these data sources may be derived directly from public data sources. For example, various existing credit risk models may rate entities (such as firms or companies) based on likelihood of defaulting on their debt using financial accounting data, such as accounting ratios and pricing information from pricing services. Example metrics computed in existing credit risk models may include a probability of default (e.g., the likelihood that an entity will fail to meet its financial obligations) and loss given default (e.g., if a default occurs, the amount those who extended credit to the entity expect to lose).

While the sources of information utilized by existing credit risk models provide valuable input to the credit risk modeling process, there is a vast amount of publicly available information that is overlooked by existing models. For example, textual based data sources such as news articles that report on a firm's past, current, and possible future events typically include important information that is not considered in the credit risk modeling process. Further, the semantic context of text included in these data sources is typically not analyzed by these processes. Accordingly, there is a need for an improved credit risk modeling process capable of considering documents related to an entity, including the unstructured text in these documents, in addition to the financial account data considered by currently existing credit risk models.

SUMMARY

The systems and methods described herein relate to implementing and training a credit risk model. For example, the systems and methods described herein may relate to a system configured to utilize a next-generation deep learning neural network to computationally assess credit quality for various entities. In various implementations, the system may analyze unstructured text from documents including one or more of news, research, filings, transcripts, and/or other textual or tabular sources to determine relationships between words and phrases that are indicative of one or more future financial events (e.g., financial deterioration such as bankruptcy or default, or improvement). The system may understand relationships in the meaning and/or context of words and phrases in the individual documents without preprocessing the text or creating stop words, n-grams, and/or other dictionaries used for text mining in a bag-of-words model.

The credit risk model utilized by the systems and methods described herein represents an improvement over existing credit risk models. For example, by unifying several different credit risk modeling approaches within a single model framework, the credit risk model described herein produces an improved assessment of the default probability of an entity that takes into account additional information available related to an entity, such as documents related to that entity comprising unstructured text. The improved credit risk model is able to look at these documents both individually and collectively to identify relationships across a collection of documents. Additionally, the credit risk model described herein produces a sequence of default probability scores representing overall likelihoods of the occurrence of one or more financial events for an entity. Accordingly, unlike conventional credit risk models, the systems and methods described herein are able to produce an indication of the default probability of an entity at various intervals over a period of time, rather than a single assessment of the default probability of an entity at one particular time.

In various implementations, the systems and methods described herein may utilize a deep learning neutral network comprising a document model and a company model. The document model may use a deep-learning model with memory to read text of a document, understand long range relationships between words, phrases, and the occurrence of the one or more financial events, and create a document score that indicates whether the one or more financial events are likely according to the document. The document model may generate a document-model-state vector that represents important features and relationships identified within each document and across a set of documents for a given entity. The company model may produce a sequence of default probability scores representing overall likelihoods of the occurrence of one or more financial events for an entity based on the document-model-state vector for the documents associated with that entity. The company model may aggregate the document-model-state vector with financial information for the entity to produce individual default probability scores in the sequence of default probability scores. The financial information may include one or more of pricing data, fundamental ratios, and/or other tabular data.

The system described herein may include one or more of servers, client computing platforms, document sources, financial sources, external resources, and/or other components. In various implementations, the system may include one or more servers comprising electronic storage and one or more physical processors. The one or more physical processors may be configured by computer-readable instructions. Executing the computer-readable instructions may cause the one or more physical processors to implement and train a credit risk model. The computer-readable instructions may include one or more computer program components. The computer program components may include one or more of a document model component, a company model component, a model training component, and/or other computer program components. The one or more physical processors may represent processing functionality of multiple components of the system operating in coordination. Therefore, the various processing functionality described in relation to the one or more processors may be performed by a single component or by multiple components of the system.

The document model component may be configured to implement a document model to produce individual document scores for individual documents representing a likelihood of the occurrence of one or more financial events for an entity based on those individual documents. In various implementations, the document model component operates as an encoder to generate a "document-representation"—or document-representation vector—for each document associated with a given entity and generated, obtained, published, and/or otherwise made available during a period of time. For example, the document model component may be configured to generate a document-representation vector for each document in a trailing history (e.g., the last 12 months). In various implementations, the document score produced for a document is based on the generated vector(s) for that document. In various implementations, individual document scores may be individual predictive descriptors comprising a number between zero (0) and one (1), with zero (0) indicating a default and/or bankruptcy being very unlikely and one (1) indicating a default and/or bankruptcy being likely. In various implementations, the document model component aggregates the document-representation vectors and document scores to create a document-model-state vector. The document-model-state vector represents important features and relationships identified within each document and across a set of documents for a given entity.

The company model component may be configured to implement a company model to produce a sequence of default probability scores representing overall likelihoods of the occurrence of one or more financial events for an entity based on the document-model-state vector for the documents associated with that entity. In various implementations, the company model component operates as a decoder to output company scores (e.g., between zero (0) and one (1)). A company score may represent a default probability for an entity. Based on the document-model-state vector created by the document model component and other inputs (such as entity financial information), the company model component may produce company scores along with an updated internal state vector—the company-model-state vector. The company model may comprise an adaptation of one or more deep learning models typically used for text translation, including a sequence-to-sequence model. Instead of training the model to translate text (e.g. a sequence of English words to a sequence of French words) the company model may be trained to translate a sequence of classifier states and document scores to the sequence of default probability scores.

The model training component may be configured to utilize a backpropagation algorithm to train the deep learning neutral network. In various implementations, the model training component may be configured to define each layer of the document model and/or company model (i.e., the credit risk model) and initialize each parameter with random values. In various implementations, the model training component may be configured to run the full model with thousands or millions of historical examples to determine whether the output from the full model matches the desired output. In some implementations, the model training component may be configured to train the document model and the company model individually. In some implementations, the model training component may be configured to train the document model and the company model in a single training step, rather than training each model individually.

These and other objects, features, and characteristics of the system and/or method disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

Figure 1:
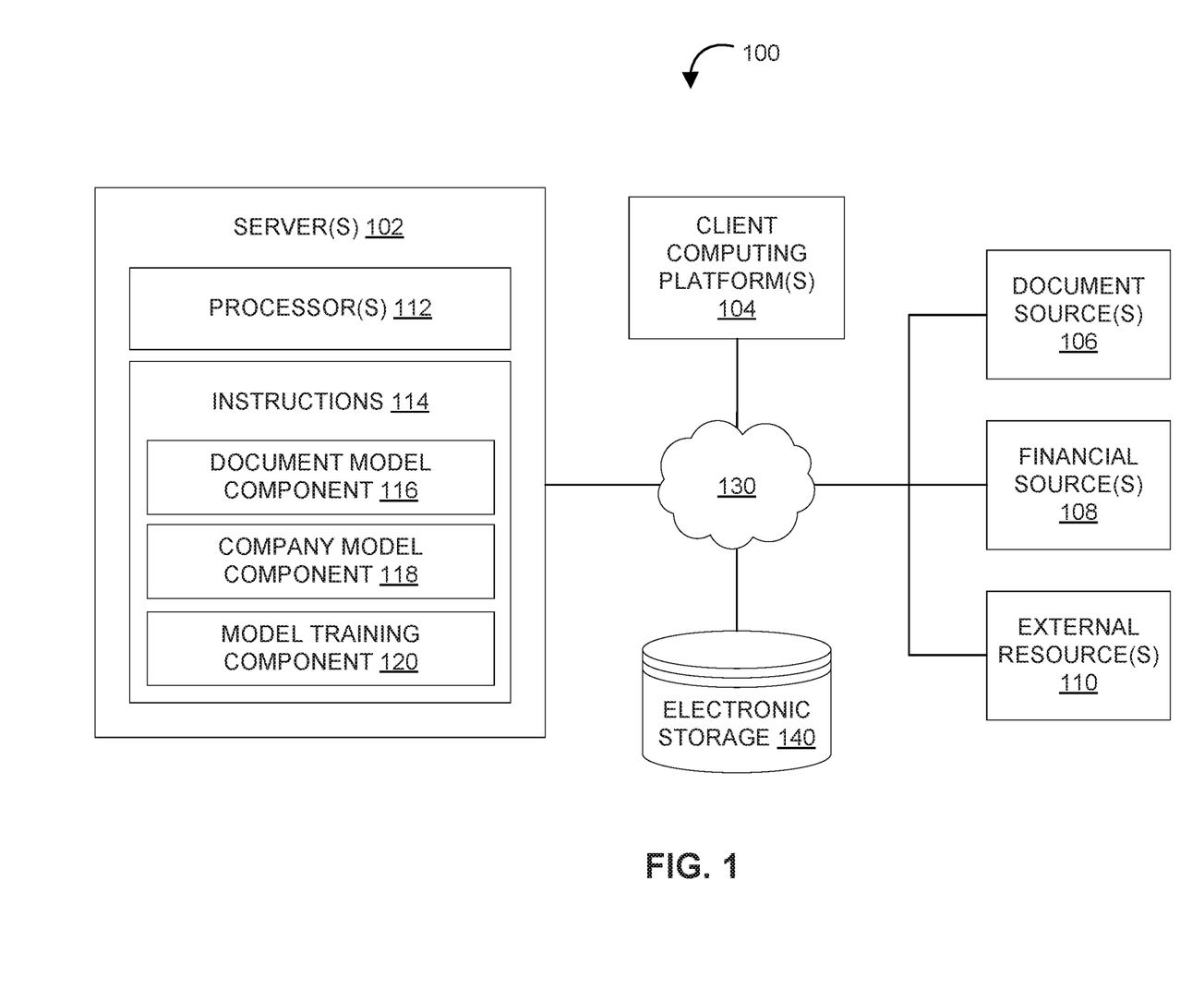
FIG. 1 illustrates an example of a system configured to implement and train a credit risk model for assessing the credit quality of an entity, in accordance with one or more implementations.

FIG. 1 illustrates a system 100 configured to implement and train a credit risk model for assessing the credit quality of an entity, in accordance with one or more implementations. In various implementations, system 100 may be configured to utilize a deep learning, convolutional neural network comprising a document model and a company model. The deep learning neural network may be configured to computationally assess credit quality for various entities. For example, the deep learning neural network may be configured to predict a number of future financial events including, but not limited to, probability of default or bankruptcy, loss given default, probability of rating agency rating change, probability of equity price moves, and/or other financial events.

In various implementations, system 100 may include one or more of one or more servers 102, one or more client computing platforms 104, one or more document sources 106, one or more financial sources 108, external resource(s) 110, electronic storage 140, and/or other components. In some implementations, one or more servers 102 and one or more other components of system 100 may be included within a single device configured to implement and train a credit risk model. For example, one or more servers 102 and electronic storage 140 may be included within a single device.

In some implementations, server(s) 102, one or more client computing platforms 104, one or more document sources 106, one or more financial sources 108, external resources 110, and/or one or more other components of system 100 may be operatively linked via one or more electronic communication links. For example, such electronic communication links may be established, at least in part, via a network 130 such as the Internet, Bluetooth, and/or other networks. It will be appreciated that this is not intended to be limiting, and that the scope of this disclosure includes implementations in which server(s) 102, one or more client computing platforms 104, one or more document sources 106, one or more financial sources 108, and/or other components may be operatively linked via some other communication media.

A given client computing platform 104 may include one or more processors configured to execute computer program components. The computer program components may be configured to enable an expert or user associated with the given client computing platform 104 to interface with system 100 and/or external resources 110, and/or provide other functionality attributed herein to client computing platform(s) 104. By way of non-limiting example, a given client computing platform may include one or more of a desktop computer, a laptop computer, a handheld computer, a tablet computing platform, a NetBook, a Smartphone, and/or other computing platforms.

External resources 110 may include sources of information outside of system 100, external entities participating with system 100, and/or other resources. In some implementations, some or all of the functionality attributed herein to external resources 110 may be provided by resources included in system 100.

Illustration of one or more processors 112 in FIG. 1 is not intended to be limiting. The one or more processors 112 may include a plurality of hardware, software, and/or firmware components operating together to provide the functionality attributed herein to one or more processors 112. For example, one or more processors 112 may be implemented by a cloud of computing platforms operating together as one or more processors 112.

Electronic storage 140 may comprise non-transitory storage media that electronically stores information. The electronic storage media of electronic storage 140 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Although electronic storage 140 is shown in FIG. 1 as a single entity, this is for illustrative purposes only. In some implementations, electronic storage 140 may comprise multiple storage units. These storage units may be physically located within the same device, or electronic storage 140 may represent storage functionality of multiple devices operating in coordination.

Electronic storage 140 may store software algorithms, information determined by processor(s) 112, information received from server(s) 102, information received from one or more client computing platforms 104, information received from one or more document sources 106, information received from one or more financial sources 108, and/or other information that enables server(s) 102 to function as described herein.

In various implementations, server(s) 102 may further include non-transitory electronic storage. For example, server(s) 102 may include non-transitory electronic storage the same as or similar to electronic storage 140. In various implementations, non-transitory electronic storage of server(s) 102 may be configured to store a machine-learning algorithm and/or other information configured to facilitate cloud-based point-to-point data transfer. The machine-learning algorithm may include an unsupervised goal-based machine learning program. The machine-learning algorithm may be provided input from one or more components of computer readable instructions 114. Compared to supervised learning where training data is labeled with the appropriate classifications, unsupervised learning may learn relationships between elements in the provided data sets and provide output without user input. The relationships can take many different algorithmic forms, but some models may have the same goal of mimicking human logic by searching for indirect hidden structures, patterns, and/or features to analyze new data.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor(s) 112 is illustrated in FIG. 1 as a single component, this is for illustrative purposes only. In some implementations, processor(s) 112 may comprise multiple processing units. These processing units may be physically located within the same device, or processor(s) 112 may represent processing functionality of multiple devices operating in coordination. Processor(s) 112 may be configured to execute one or more components by software; hardware; firmware; some combination of software, hardware, and/or firmware; and/or other mechanisms for configuring processing capabilities on processor(s) 112. As used herein, the term "component" may refer to any component or set of components that perform the functionality attributed to the component. This may include one or more physical processors during execution of processor readable instructions, the processor readable instructions, circuitry, hardware, storage media, or any other components. Furthermore, it should be appreciated that although the various instructions are illustrated in FIG. 1 as being co-located within a single processing unit, in implementations in which processor(s) 110 include multiple processing units, one or more instructions may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 110 may be programmed by one or more additional instructions that may perform some or all of the functionality attributed herein to one of the computer-readable instructions.

In various implementations, one or more servers 102 (also interchangeably referred to herein as server(s) 102, server 102, or servers 102 for convenience) may be configured to communicate with one or more client computing platforms 104, one or more document sources 106, one or more financial sources 108, external resource(s) 110, and/or other components of system 100 according to a client/server architecture, peer-to-peer architecture, and/or other architectures. Users may access system 100 via client computing platform(s) 104. The server(s) 102 may provide the client computing platform(s) 104 with information necessary to present user interfaces on the client computing platform(s) 104. The client computing platform(s) 104 may communicate information back to server(s) 102 in order to facilitate further processing and/or functionality at server(s) 102. Communications may be facilitated through network(s) 130. The network(s) 130 may include wired and/or wireless connections. The network(s) 130 may include the Internet, Bluetooth, USB, and/or other communication networks. It will be appreciated that this is not intended to be limiting and that the scope of this disclosure includes implementations in which components of system 100 may be operatively linked via some other communication media.

Individual document sources of one or more document sources 106 may include entities which publish and/or otherwise make publicly available documents about one or more entities. The documents may comprise one or more of news, research, filings, transcripts, and/or other textual or tabular sources that include unstructured text. In various implementations, the systems and methods described herein may be configured to analyze the unstructured text in the documents to determine relationships between words and phrases that are indicative of one or more future financial events (e.g., financial deterioration such as bankruptcy or default, or improvement). By way of non-limiting illustration, an individual document source may include one or more of a business entity, a reporting agency, and/or other source. The documents may include content indicative of one or more future financial events (e.g., financial deterioration such as bankruptcy or default, or improvement) for one or more entities. In some implementations, the documents may include web document accessed from webpages associated with the individual document sources.

Individual financial sources of one or more financial sources 108 may include entities which publish and/or otherwise make publicly available financial information for one or more entities. The financial information may include one or more of pricing data, fundamental ratios, and/or other information. By way of non-limiting illustration, an individual financial source may include one or more of a business entity, a reporting agency, and/or other source.

In various implementations, server(s) 102 may include one or more physical processors 112 and/or other components. The one or more physical processors 112 (also interchangeably referred to herein as processor(s) 112, processor 112, or processors 112 for convenience) may be configured to provide information processing capabilities in system 100. As such, the processor(s) 112 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

In various implementations, processor(s) 112 may be configured to execute one or more computer readable instructions 114. Executing the computer readable instructions 114 may cause one or more processors 112 to implement and train a credit risk model. Computer readable instructions 114 may include one or more computer program components. In some implementations, computer readable instructions 114 may be stored in electronic storage (e.g., electronic storage 140). Computer readable instructions 114 may include one or more of document model component 116, company model component 118, model training component 120, and/or other computer program components. As used herein, for convenience, the various computer readable instructions 114 will be described as performing an operation, when, in fact, the various instructions program the processor(s) 112 (and therefore system 100) to perform the operation.

Document model component 116 may be configured to utilize a document model to produce individual document scores for individual documents representing a likelihood of the occurrence of one or more financial events for an entity based on the individual documents. The document model may use a deep-learning model with memory to read text of a document, understand long range relationships between words, phrases, and the occurrence of the one or more financial events, and create a document score that indicates whether the one or more financial events are likely according to the document. The document model may understand relationships in the meaning and/or context of words and phrases in the individual documents without preprocessing the text or creating stop words, n-grams, and/or other dictionaries used for text mining in a bag-of-words model. The memory of the document model may represent a classifier state at a given period in time and/or over a certain time period.

In various implementations, document model component 116 may be configured to obtain individual documents related to at least one entity. For example, document model component 116 may be configured to obtain individual documents from one or more document sources 106. In some implementations, document model component 116 may be configured to obtain individual documents from one or more document sources 106 sequentially as they are made accessible (e.g., published) over time.

In various implementations, document model component 116 may be configured to analyze unstructured text from documents including one or more of news, research, filings, transcripts, and/or other textual or tabular sources to determine relationships between words and phrases that are indicative of one or more future financial events (e.g., financial deterioration such as bankruptcy or default, or improvement). For example, document model component 116 may be configured to analyze unstructured text from individual documents obtained from one or more document sources 106.

In various implementations, document model component 116 may be configured to generate a "document-representation"—or document-representation vector—for each document associated with a given entity. For example, document model component 116 may be configured to generate a document-representation vector for each document associated with a given entity that is generated, obtained, published, and/or otherwise made available during a period of time. In some implementations, document model component 116 may be configured to generate a document-representation vector for each document in a trailing history (e.g., the last 12 months). In various implementations, document model component 116 may be configured to generate a document-representation vector for individual documents obtained from one or more document sources 106.

In various implementations, document model component 116 may be configured to obtain, via the document model, individual document scores for individual documents associated with individual entities. For example, an entity may comprise a company, firm, and/or other business entity. In various implementations, document model component 116 may be configured to produce, for each of a set of documents, a document score that indicates whether the one or more financial events are likely to occur based on each individual document. In various implementations, document model component 116 may be configured to produce a document score for a document based on the document-representation vector(s) generated for that document.

In various implementations, document model component 116 may be configured to obtain and/or arrange a set of document scores as a sequence of document scores. The sequence may represent a timeline over which the individual documents were made available and individual scores assigned. In some implementations, document model component 116 may be configured to obtain a group of documents over a certain time period (e.g., a day, week, month, etc.) to produce one or more documents scores for that time period. In some implementations, document model component 116 may be configured to consecutively obtain groups of documents over consecutive time periods (e.g., a day, week, month, etc.) to produce a graph of documents scores per time period as a function of time. In some implementations, document model component 116 may be configured to aggregate multiple documents together and process them as a single document. For example, document model component 116 may process multiple documents relating to an entity over a certain time period (e.g., a day, week, month, etc.) as one document. As used herein the word "document" may include a single document, a group of multiple documents, a portion of a single document, and/or a combination thereof.

Individual document scores may represent a likelihood of the occurrence of one or more future financial events for the entity based on the individual documents. In various implementations, document model component 116 may be configured to determine a document score for an individual document based on the relationships between words and/or phrases in that document and the likelihood of the occurrence of one or more financial events. In other words, the appearance of certain words and/or phrases in a document indicate a higher (or lower) likelihood of the occurrence of one or more financial events. In various implementations, document model component 116 may be configured to determine a document score for a document via a deep learning neural network and/or other techniques. In some implementations, the individual document scores may be individual predictive descriptors comprising a number between zero (0) and one (1), with zero (0) indicating a default and/or bankruptcy being very unlikely and one (1) indicating a default and/or bankruptcy being likely. In some implementations, document model component 116 may be configured to distinguish between documents conveying a likelihood of the occurrence of a future financial event and documents which merely include negative information. Negative information may refer to information that may be adverse to a reputation of an entity but not necessarily indicative of default, bankruptcy, and/or other financial event. In various implementations, document model component 116 may be configured to aggregate the document-representation vectors and document scores to create a document-model-state vector. A document-model-state vector represents features and relationships identified within each document and across a set of documents for a given entity.

In various implementations, the document scores may be the same as, or produced in a similar manner to, predictive descriptors, labels, feature vectors, and/or other information, as described in U.S. Pat. No. 8,671,040 to Ryan D. Roser et. al., filed Jul. 23, 2010, and entitled "CREDIT RISK MINING," the disclosure of which is hereby incorporated by reference in its entirety herein. By way of non-limiting illustration, the document model utilized by document model component 110 may be the same as, or similar to, one or more models described in U.S. Pat. No. 8,671,040.

Figure 2:
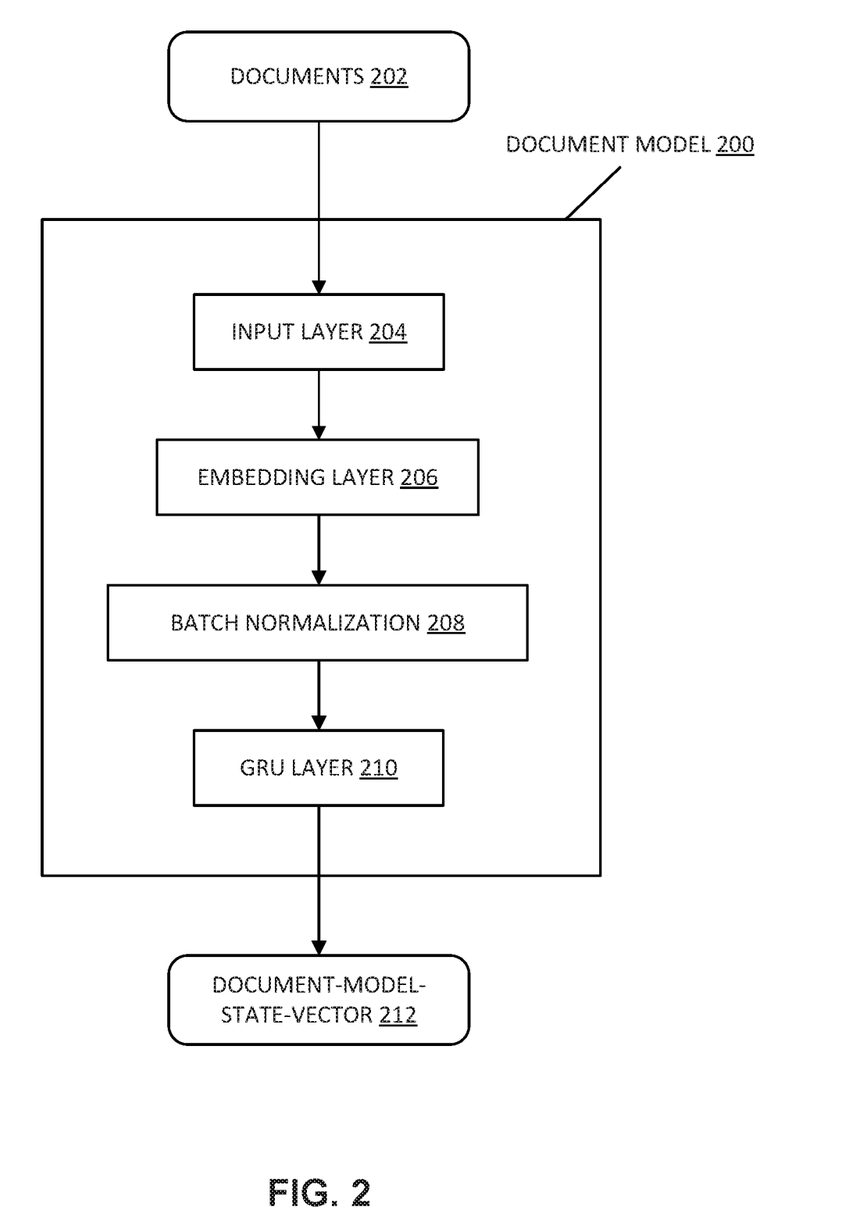
FIG. 2 illustrates an example of a document model of a credit risk model, in accordance with one or more implementations.
Figure 3:
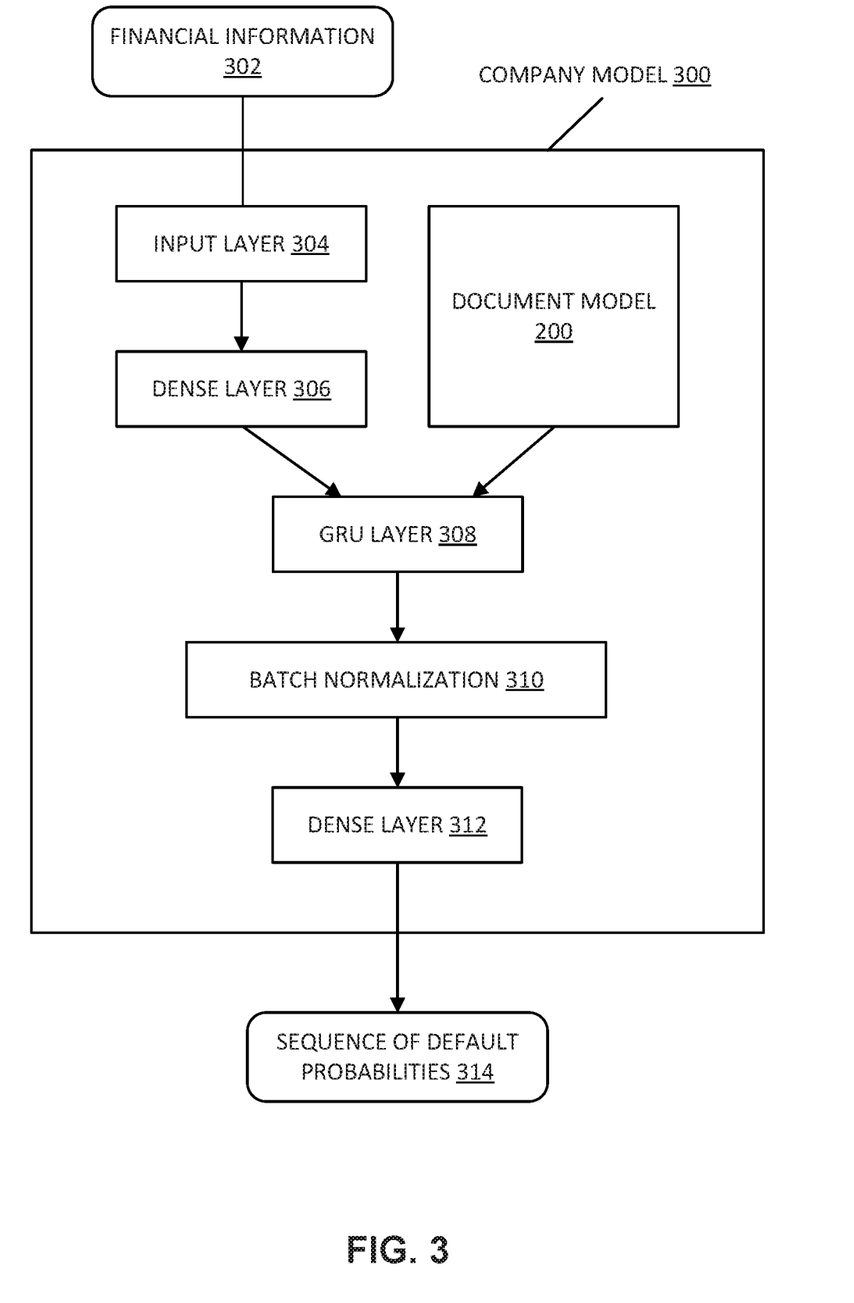
FIG. 3 illustrates an example of a company model of a credit risk model, in accordance with one or more implementations.

FIG. 2 illustrates an example of a document model 200 of a credit risk model, in accordance with one or more implementations. In various implementations, document model component 116 may be configured to utilize a document model the same as or similar to document model 200 to produce individual document scores for individual documents representing a likelihood of the occurrence of one or more financial events for an entity based on the individual documents. In various implementations, document model 200 may comprise an input layer 204 configured to receive documents 202. For example, documents 202 may comprise one or more documents received from one or more document sources 106. For each document received, document model 200 may be configured to create document vectors. In various implementations, the document vectors created based on documents 202 are passed through an embedding layer 206 that is configured to create a word embedding representation of the features in that document (i.e., a document-representation vector). That vector is aggregated using several layers in a neural network (e.g., one or more layers of document model 200 and company model 300, as described further herein). A convolutional network may be passed over the vectors to get a representation of that document that is derived from and has extracted information indicating longer term relationships across the documents. For example, the word embedding representations created for each of documents 202 are then aggregated via batch normalization 208. In various implementations, a GRU network (i.e., GRU layer 210) is configured to take the sequence of documents passed in and generate an output comprising a document-model-state vector 212. The GRU network may comprise a sequential network through which the aggregated document vectors are passed, and the state of the network is updated as each document vector is read in order. The state of that network is sequentially updated, and once each document vector has been passed through the GRU network, the final state of that network is represented by the document-model-state vector 212 that is based on the collection of documents (i.e., documents 202). The document-model-state vector 212 is then passed to company model 300.

Returning back to FIG. 1, document model component 116 may be configured to cause a document-model-state vector for a given entity to be provided to company model component 118. In other words, based on the input received (e.g., individual documents from one or more document sources 106), document model component 118 may be configured to act as an encoder, aggregating generated document-representation vectors and document scores to create a document-model-state vector, which is output to the company model component 118.

Company model component 118 may be configured to utilize a company model to produce a sequence of default probability scores representing overall likelihoods of the occurrence of one or more financial events for an entity. For example, company model component 118 may be configured to produce a sequence of default probability scores representing overall likelihoods of the occurrence of one or more financial events for an entity based on aggregated document-representation vectors and document scores (i.e., the document-model-state vector) for documents associated with that entity. In various implementations, company model component 118 may be configured to operate as a decoder to output a company score (e.g., between zero (0) and one (1)) for a given entity. The company score may represent a default probability for that entity (e.g. an individual default probability score). An individual default probability score may represent an individual overall (e.g., wholistic) likelihood of occurrence of one or more future financial events based on the document-model-state vector for the documents associated with that entity, financial information, and/or other information which may have been concurrently obtained within an individual certain period of time. Accordingly, a sequence of default probability scores may represent a timeline of overall likelihoods of occurrence of one or more future financial events for a given entity.

In various implementations, company model component 118 may be configured to obtain a set of financial information for individual entities. For example, company model component 118 may be configured to obtain a set of financial information from one or more financial sources 108. The financial information may include one or more of pricing data, fundamental ratios, and/or other tabular data.

In various implementations, company model component 118 may be configured to generate, via the company model, a sequence of default probability scores representing the timeline of overall likelihoods of occurrence of one or more future financial events for the entity. For example, company model component 118 may be configured to produce a company score for an entity based on a document-model-state vector created by document model component 116. In various implementations, company model component 118 may be configured to aggregate a document-model-state vector and/or other information obtained over a certain time period with financial information also obtained within that time period for the entity to produce individual default probability scores within the sequence of default probability scores. The financial information may be used by the company model to help calibrate the state of the model and provide context for the state vector. For example, a measurement of a company's trailing volatility may be input along with at least the document-model-state vector, resulting in the production of a less volatile sequence of company scores by company model component 118 for entities with lower trailing volatility, whereas entities with higher volatility would see a larger month-to-month movement in their sequence of company scores.

Based on the document-model-state vector created by the document model component and other inputs (such as entity financial information), the company model component 118 may be configured to produce company scores along with an internal state vector—the company-model-state vector. The company-model-state vector may be same shape as the document-model-state vector. In various implementations, company model component 118 may be configured to, on second and subsequent iterations, input a company-model-state vector from a prior iteration to produce an updated company score and updated company-model-state vector. For example, company model component 118 may be configured to input a company-model-state vector from a prior iteration and one or more other tabular inputs (e.g., entity financial information) to again output a company score (i.e., an updated company score) and an updated company-model-state vector. In an example implementation, the company model utilized by company model component 118 may be trained such that each iteration corresponds to one month, and company model component 118 is configured to run twelve (12) iterations to calculate a 12-month curve of company scores (or default probability predictions).

In some implementations, the company model utilized by company model component 118 may comprise an adaptation of one or more deep learning models typically used for text translation. A deep learning model used for text translation may include a sequence-to-sequence model and/or other model. Instead of training the company model to translate text (e.g. a sequence of English words to a sequence of French words) the company model may be trained to translate a sequence of classifier states and/or document scores (e.g., obtained from the document model of document model component 110) to the sequence of default probability scores.

FIG. 3 illustrates an example of a company model 300 of a credit risk model, in accordance with one or more implementations. In various implementations, company model component 118 may be configured to utilize a company model the same as or similar to company model 300 to produce a sequence of default probability scores representing overall likelihoods of the occurrence of one or more financial events for an entity. In various implementations, company model 300 may receive as input financial information 302 and a document-model-state vector (e.g., document-model-state vector 212) generated by a document model (e.g., document model 200). In various implementations, company model 300 may comprise an input layer 304 configured to receive financial information 302. For example, financial information 302 may comprise financial information received from one or more financial sources 108. In various implementations, company model 300 may include a dense layer 306 and GRU layer 308 configured to produce company scores and a company-model-state vector. Dense layer 306 may comprise a regular layer of neurons in a neural network, wherein each neuron receives input from all the neurons in the previously layer—thus, the layer is "densely" connected. In various implementations, dense layer 306 may be configured to perform a linear operation on the layer's input vector. GRU layer 308 may comprise a layer the same as or similar to GRU layer 210, described herein with respect to FIG. 2. In various implementations, the output of GRU layer 308 is then aggregated via batch normalization 310. In various implementations, company model 300 may comprise an additional dense layer the same as or similar to dense layer 306 (i.e., dense layer 312). In various implementations, company model 300 may be configured to output at least a sequence of default probabilities (i.e., sequence of default probabilities 314) representing overall likelihoods of the occurrence of one or more financial events for an entity to which the one or more documents (i.e., documents 202) relate.

Returning back to FIG. 1, model training component 120 may be configured to utilize a backpropagation algorithm to train the deep learning neutral network described herein that comprises both a document model and a company model. In various implementations, model training component 120 may be configured to define each layer of the document model and company model (hereinafter referred to as the "full model") and initialize each parameter with random values. In various implementations, model training component 120 may be configured to run the full model with thousands or millions of historical examples to determine whether the output from the full model matches the desired output. In some implementations, model training component 120 may be configured to train the document model and the company model individually. In some implementations, model training component 120 may be configured to train the document model and the company model in a single training step (i.e., as a single "full model"). The single "full model" may also be referred to herein as a credit risk model comprising both a document model and company model.

In some implementations, model training component 120 may be configured to use historical entity defaults and bankruptcies to train the document model and/or the company model. For example, model training component 120 may be configured to train the document model and/or the company model based on a specific historical entity event. In an exemplary implementation, model training component 120 may be configured to obtain documents generated, obtained, published, and/or otherwise made available during a 12-month time period prior to the event, along with financial information for that entity known at that time. These inputs are used by the document model and the company model (i.e., document model component 116 and company model component 118, respectively) to calculate the sequence of default probability scores (or company scores). Model training component 120 may be configured to compare this sequence to historical bankruptcy and default records. With the date on which the specific historical entity event occurred known, the company score for the iteration pertaining to that date should be a one (1)—indicating a 100% likelihood of that historical financial event occurring. Model training component 120 may be configured to calculate the difference between that company score and the desired value (1) to measure the error in the score. Using a backpropagation algorithm, model training component 120 may be configured to use the measured error to make tiny adjustments to the parameters in the layers of the model(s). In various implementations, model training component 120 may be configured to repeat this process across multiple examples to train the model.

In some implementations, model training component 120 may be configured to train the document model and/or the company model using one or more other training techniques. For example, in some implementations, model training component 120 may be configured to train the document model and/or the company model using one or more training techniques described in U.S. Pat. No. 8,671,040 to Ryan D. Roser et. al., filed Jul. 23, 2010, and entitled "CREDIT RISK MINING," the disclosure of which is hereby incorporated by reference in its entirety herein.

Exemplary Flowcharts of Processes

Figure 4:
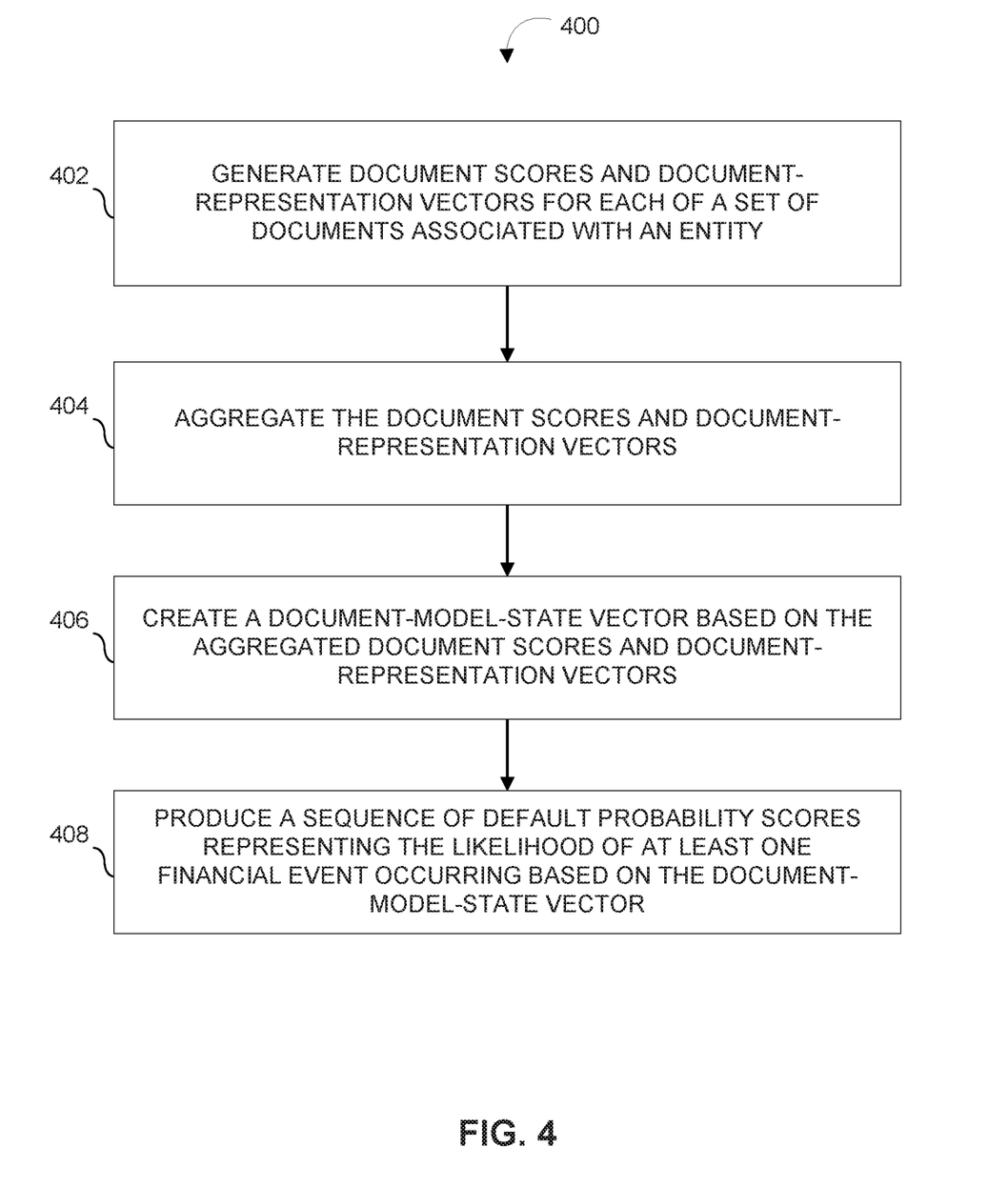
FIG. 4 illustrates an example of a method for assessing the credit quality of an entity utilizing a document model and a company model, in accordance with one or more implementations.

FIG. 4 illustrates a method 400 for assessing the credit quality of an entity utilizing a document model and a company model, in accordance with one or more implementations. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 400 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 400 in response to instructions stored electronically on one or more electronic storage mediums. The one or more processing devices may include one or more devices configured through hardware, firmware, and/or software to be specifically designed for execution of one or more of the operations of method 400.

In an operation 402, method 400 may include generating document scores and document-representation vectors for each of a set of documents associated with an entity. In various implementations, a set of documents associated with an entity may be obtained from one or more document sources. The documents may comprise documents associated with a given entity and generated, obtained, published, and/or otherwise made available during a predefined time period. In various implementations, the document scores and document-representation vectors may be generated based on the text of the documents utilizing a document model. The document score for a given document indicates a likelihood of the occurrence of one or more future financial events for a given entity based on that document. The future financial event may comprise default and/or bankruptcy. In some implementations, operation 402 may be performed by a processor component the same as or similar to document model component 116 (shown in FIG. 1 and described herein).

In an operation 404, method 400 may include aggregating the document scores and document-representation vectors. In some implementations, operation 404 may be performed by a processor component the same as or similar to document model component 116 (shown in FIG. 1 and described herein).

In an operation 406, method 400 may include creating a document-model-state vector based on the aggregated document scores and document-representation vectors. The document-model-state vector may represent relationships identified within each of the documents to which the document scores and document-representation vectors are associated and relationships identified across the documents. In various implementations, the document-model-state vector may comprise the output of a document model. In some implementations, operation 406 may be performed by a processor component the same as or similar to document model component 116 (shown in FIG. 1 and described herein).

In an operation 408, method 400 may include producing a sequence of default probability scores representing the likelihood of at least one financial event occurring based on the document-model-state vector. The sequence of default probability scores may be produced utilizing a neural network comprising a document model and a company model. In various implementations, the document-model-state vector output from the document model and financial information for the entity may be aggregated. The sequence of default probability scores may be determined based on the aggregated document-model-state vector and financial information. In various implementations, the sequence of default probability scores may comprise the output of the company model. In some implementations, a company score may be generated based on the sequence of default probability scores. The company score may comprise a single value between zero (0) and one (1) and represent a default probability for the entity. In some implementations, an internal state vector—a company-model-state vector—may be generated based on the document-model-state vector utilizing the company model. In some implementations, additional iterations may be run to update the company-model-state vector. For example, the company model may receive as input a company-model-state vector generated in a prior iteration based on a first document-model-state vector along with a second document-model-state vector that was generated based on aggregated document scores and document-representation vectors for a second set of documents. Utilizing the company model, a second sequence of default probability scores may be produced based at least on the second document-model-state vector, and an updated company-model-state vector may be generated based on the company-model-state vector generated in the prior iteration and the second document-model-state vector. In some implementations, operation 408 may be performed by a processor component the same as or similar to company model component 118 (shown in FIG. 1 and described herein).

In various implementations, method 400 may further comprise training the document model and the company model. For example, the document model and the company model may be trained using a backpropagation algorithm. In some implementations, the document model and the company model may be trained individually. In other implementations, the document model and the company model may be trained in a single training step (i.e., as a single "full model"). The single "full model" may also be referred to herein as a credit risk model comprising both the document model and the company model. In some implementations, training the document model and the company model may be performed by a processor component the same as or similar to model training component 120 (shown in FIG. 1 and described herein).

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to use a trained neural network to computationally assess the credit quality of an entity based at least in part on analyzing unstructured text from documents related to the entity to determine relationships between words and phrases that are indicative of one or more future financial events and utilizing a document model and a company model, the system comprising:

one or more servers comprising electronic storage, one or more physical processors, and computer program components comprising a document model component including the document model configured to analyze unstructured text from documents, and a company model component configured to utilize the company model to produce a sequence of default probability scores representing overall likelihoods of the occurrence of one or more financial events for an entity, the one or more physical computer processors configured by computer readable instructions to:

electronically obtain a set of documents related to a first entity from one or more document sources over a network, the set of documents comprising at least a first document containing unstructured text and a second document containing unstructured text;

access the trained neural network comprising the document model and the company model;

analyze, utilizing the document model, the unstructured text from at least the first and second documents of the set of documents by reading the unstructured text and understanding long range relationships between words, phrases, and the occurrence of one or more future financial events;

generate, utilizing the document model, document scores for at least the first and second documents of the set of documents based on the analyzed text, the document scores including a first document score for the first document of the set of documents and a second document score for the second document of the set of documents, wherein the first and second document scores each indicate a likelihood of an occurrence of one or more future financial events for the first entity based on the first and second document, respectively;

generate, utilizing the document model, document-representation vectors for at least the first and second documents of the set of documents based on the analyzed text, the document-representation vectors including a first document-representation vector comprising a word embedding representation of the first document of the set of documents and a second document-representation vector comprising a word embedding representation of the second document of the set of documents;

aggregate the first and second document scores and the first and second document-representation vectors;

create, using the aggregated first and second document scores and first and second document-representation vectors, a document-model-state vector representing relationships identified within individual documents of the set of documents and across the set of documents;

output from the document model the document-model-state vector;

produce, utilizing the company model, a sequence of default probability scores representing overall likelihoods of the occurrence of one or more future financial events based on the document-model-state vector for the set of documents related to the first entity; and aggregate the document-model-state vector with financial information for the entity.

2. The system of claim 1, wherein the sequence of default probability scores are produced utilizing the document model and the company model.

3. The system of claim 1, wherein the one or more processors are further configured to:
generate a company score for the first entity based on the sequence of default probability scores, the company score comprising a value between zero (0) and one (1) and representing a default probability for the first entity.

4. The system of claim 1, wherein the one or more future financial events comprise one or more of default or bankruptcy.

5. The system of claim 1,
wherein the sequence of default probability scores is determined based on the aggregated document-model-state vector and financial information.

6. The system of claim 1, wherein the one or more processors are further configured to:
generate, utilizing the company model, an internal state vector based on the document-model-state vector, wherein the internal state vector comprises a first company-model-state vector.

7. The system of claim 6, wherein the one or more processors are further configured to:
input, into the company model, a second document-model-state vector and the first company-model-state vector, wherein the second document-model-state vector is based on aggregated document scores and document-representation vectors for a second set of documents;

produce, utilizing the company model, a second sequence of default probability scores representing overall likelihoods of the occurrence of one or more future financial events based on at least the second document-model-state vector; and generate, utilizing the company model, a second internal state vector comprising a second company-model-state vector based on the second document-model-state vector and the first company-model-state vector.

8. The system of claim 1, wherein the one or more processors are further configured to:
train the document model and the company model in a single training step using a backpropagation algorithm.

9. The system of claim 1, wherein the sequence of default probability scores further comprises a timeline of the overall likelihoods of the occurrence of one or more future financial events.

10. The system of claim 1, wherein the document model comprises a deep-learning model with memory that reads the text from at least the first and second documents of the set of documents, understands long range relationships between words, phrases, and the occurrence of the one or more future financial events, and creates at least the first and second document scores.

11. The system of claim 10, wherein the document model understands the long range relationships without preprocessing the text or creating stop words, n-grams, and/or other dictionaries used for text mining in a bag-of-words model.

12. The system of claim 10, wherein the memory of the document model represents a classifier state at a first time period.

13. The system of claim 1, wherein the document model comprises:
an input layer that receives at least the first and second documents of the set of documents;
an embedding layer creating at least the first and second document-representation vectors;
batch normalization that aggregates at least the first and second document-representation vectors; and
a GRU layer that generates the document-model-state vector, comprising a sequential network through which the aggregated document vectors are passed.

14. The system of claim 1, wherein the company model comprises a sequence-to-sequence model.

15. The system of claim 1, wherein the company model is trained to translate a sequence of document scores to the sequence of default probability scores.

16. The system of claim 1, wherein the company model comprises a first dense layer that generates a company-model-state vector, the first dense layer comprising a regular layer of neurons in the trained neural network.

17. The system of claim 1, the system further comprising a model training component configured to define layers of the document model and company model as a full model and run the full model with historical examples to determine whether an output from the full model matches a desired output.

18. The system of claim 1, wherein the company model is trained to translate a sequence of classifier states and/or document scores obtained from the document model of the document model component to the sequence of default probability scores.

19. A method for using a trained neural network to computationally assess the credit quality of an entity based at least in part on analyzing unstructured text from documents related to the entity to determine relationships between words and phrases that are indicative of one or more future financial events and utilizing a document model and a company model, the method comprising:
- storing computer program components comprising a document model component including the document model configured to analyze unstructured text from documents, and a company model component configured to utilize the company model to produce a sequence of default probability scores representing overall likelihoods of the occurrence of one or more financial events for an entity;
- electronically obtaining a set of documents related to a first entity from one or more document sources over a network, the set of documents comprising at least a first document containing unstructured text and a second document containing unstructured text;
- accessing the trained neural network comprising the document model and the company model;
- analyze, utilizing the document model, the unstructured text from at least the first and second documents of the set of documents by reading the unstructured text and understanding long range relationships between words, phrases, and the occurrence of one or more future financial events;
- generating, utilizing the document model, document scores for at least the first and second documents of the set of documents based on the analyzed text, the document scores including a first document score for the first document of the set of documents and a second document score for the second document of the set of documents, wherein the first and second document scores each indicate a likelihood of an occurrence of one or more future financial events for the first entity based on the first and second document, respectively;
- generating, utilizing the document model, document-representation vectors for at least the first and second documents of the set of documents based on the analyzed text, the document-representation vectors including a first document-representation vector comprising a word embedding representation of the first document of the set of documents and a second document-representation vector comprising a word embedding representation of the second document of the set of documents;
- aggregating the document scores and document-representation vectors;
- creating, using the aggregated first and second document scores and first and second document-representation vectors, a document-model-state vector representing relationships identified within individual documents of the set of documents and across the set of documents;
- output from the document model the document-model-state vector; and
- producing, utilizing the company model, a sequence of default probability scores representing overall likelihoods of the occurrence of one or more future financial events based on the document-model-state vector for the set of documents related to the first entity; and
- aggregating the document-model-state vector with financial information for the entity.

20. The method of claim 19, wherein the sequence of default probability scores are produced utilizing the document model and the company model.

21. The method of claim 19, the method further comprising:
- generating a company score for the first entity based on the sequence of default probability scores, the company score comprising a value between zero (0) and one (1) and representing a default probability for the first entity.

22. The method of claim 19, wherein the one or more future financial events comprise one or more of default or bankruptcy.

23. The method of claim 19, wherein the sequence of default probability scores is determined based on the aggregated document-model-state vector and financial information.

24. The method of claim 19, the method further comprising:
- generating, utilizing the company model, an internal state vector based on the document-model-state vector, wherein the internal state vector comprises a first company-model-state vector.

25. The method of claim 24, the method further comprising:
- inputting a second document-model-state vector and the first company-model-state vector into the company model, wherein the second document-model-state vector is based on aggregated document scores and document-representation vectors for a second set of documents;
- producing, utilizing the company model, a second sequence of default probability scores representing overall likelihoods of the occurrence of one or more future financial events based on at least the second document-model-state vector; and
- generating, utilizing the company model, a second internal state vector comprising a second company-model-state vector based on the second document-model-state vector and the first company-model-state vector.

26. The method of claim 19, the method further comprising:
- training the document model and the company model in a single training step using a backpropagation algorithm.

27. The method of claim 19, wherein the sequence of default probability scores further comprises a timeline of the overall likelihoods of the occurrence of one or more future financial events.

28. The method of claim 19, wherein the document model comprises a deep-learning model with memory that reads the text from at least the first and second documents of the set of documents, understands long range relationships between words, phrases, and the occurrence of the one or more future financial events, and creates at least the first and second document scores.

29. The method of claim 28, wherein the document model understands the long range relationships without preprocessing the text or creating stop words, n-grams, and/or other dictionaries used for text mining in a bag-of-words model.

30. The method of claim 28, wherein the memory of the document model represents a classifier state at a first time period.

31. The method of claim 19, wherein the document model comprises:
- an input layer that receives at least the first and second documents of the set of documents;
- an embedding layer creating at least the first and second document-representation vectors;
- batch normalization that aggregates at least the first and second document-representation vectors; and a GRU layer that generates the document-model-state vector, comprising a sequential network through which the aggregated document vectors are passed.

32. The method of claim 19, wherein the company model comprises a sequence-to-sequence model.

33. The method of claim 19, wherein the company model is trained to translate a sequence of document scores to the sequence of default probability scores.

34. The method of claim 19, wherein the company model comprises a first dense layer that generates a company-model-state vector, the first dense layer comprising a regular layer of neurons in the trained neural network.

35. The method of claim 19, the method further comprising using a model training component to define layers of the document model and company model as a full model and run the full model with historical examples to determine whether an output from the full model matches a desired output.

36. The method of claim 19, wherein the company model is trained to translate a sequence of classifier states and/or document scores obtained from the document model of the document model component to the sequence of default probability scores.

* * * * *